United States Patent
Pate et al.

(10) Patent No.: US 6,757,292 B2
(45) Date of Patent: Jun. 29, 2004

(54) AUTOMATIC ADJUSTMENT OF BUFFER DEPTH FOR THE CORRECTION OF PACKET DELAY VARIATION

(75) Inventors: Prayson Will Pate, Durham, NC (US); Robert Leroy Lynch, Raleigh, NC (US); Michael Joseph Poupard, Youngsville, NC (US)

(73) Assignee: Overture Networks, Inc., Morrisville, NC (US)

( * ) Notice: Subject to any disclaimer, the term of this patent is extended or adjusted under 35 U.S.C. 154(b) by 134 days.

(21) Appl. No.: 10/141,592

(22) Filed: May 8, 2002

(65) Prior Publication Data

US 2003/0086372 A1 May 8, 2003

Related U.S. Application Data

(60) Provisional application No. 60/304,600, filed on Jul. 11, 2001.

(51) Int. Cl.[7] .............................................. H04L 12/56
(52) U.S. Cl. ....................... 370/412; 370/229; 370/516; 375/372
(58) Field of Search ................................ 370/394, 516, 370/232, 471, 412–418, 229–231, 233–238; 710/29; 709/231, 214; 375/372

(56) References Cited

U.S. PATENT DOCUMENTS

| | | | |
|---|---|---|---|
| 5,383,189 A | 1/1995 | Matsuyama et al. | |
| 5,541,926 A | 7/1996 | Saito et al. | |
| 5,802,310 A | 9/1998 | Rajaraman | |
| 5,878,032 A | 3/1999 | Mirek et al. | |
| 5,961,640 A | 10/1999 | Chambers et al. | |
| 6,169,748 B1 | 1/2001 | Barbas et al. | |
| 6,233,240 B1 | 5/2001 | Barbas et al. | |
| 6,233,251 B1 | 5/2001 | Kurobe et al. | |
| 6,256,315 B1 | 7/2001 | Barbas et al. | |
| 6,360,271 B1 | 3/2002 | Schuster et al. | |
| 6,366,959 B1 | 4/2002 | Sidhu et al. | |
| 6,434,606 B1 | 8/2002 | Borella et al. | |
| 6,452,950 B1 | 9/2002 | Ohlsson et al. | |
| 6,578,105 B2 | 6/2003 | Finn et al. | |
| 6,603,759 B1 | 8/2003 | Moskal et al. | |
| 6,643,259 B1 * | 11/2003 | Borella et al. | ............... 370/231 |
| 2002/0031126 A1 | 3/2002 | Crichton | |

OTHER PUBLICATIONS

Web pages from Zarlink Semiconductors, Inc. with press release dated Apr. 23, 2002, entitled *Zarlink Semiconductor Sets New Performance and Quality Benchmarks for IP (Internet Protocol) Networking* (printed Feb. 17, 2003; http://news.zarlink.com/common/parser./archive/2002/Apr/23/news001.xml (2 pages).

(List continued on next page.)

*Primary Examiner*—John Pezzlo
(74) *Attorney, Agent, or Firm*—Kevin E. Flynn; Daniels Daniels & Verdonik, P.A.

(57) ABSTRACT

The size of a Jitter Absorption Buffer (JAB) is automatically changed in response to changes in network conditions. The JAB size is changed based on the fullness of the JAB and the recent variations in JAB depth. Automatic adjustment allows for a balance of providing adequate correction for Packet Delay Variation (PDV) while avoiding unnecessary increases in Absolute Packet Delay (APD) from the prolonged use of an oversized JAB. This abstract is provided as a tool for those searching for patents, and not as a limitation on the scope of the claims.

25 Claims, 6 Drawing Sheets

OTHER PUBLICATIONS

Data Sheet from Zarlink Semiconductors, Inc. for *MT90880/1/2/3, TDM to Packet Processors*, dated Sep. 2002, 81 pages.

Kouvelas, Isidor, Thesis entitled *A Combined Network, System and User Based Approach to Improving the Quality of Multicast Audio*, (May 1998) submitted to the *Department of Computer Science at the University College, London* (125 pages).

Liang et al. *Adaptive Playout Scheduling Using Time–Scale Modification in Packet Voice Communications ICASSP 2001*, Salt Lake City, UT (May 2001) *Information Systems Laboratory, Department of Electrical Engineering, Stanford University*, (printed Sep. 25, 2002), as found at http://www–ise.stanford.edu/'yiliang/presentations/index.html (1 page).

Liang et al. Series of Powerpoint pages entitled *Adaptive Playout Scheduling Using Time–Scale Modification* (Mar. 8, 2001), (printed Sep. 25, 2002), (14 pages) as found at http://www–ise.stanford.edu/'yiliang/presentations/index.html as found under heading at *Netergy VoIP Project: A Show–and–Tell*.

Liang Yi Series of Powerpoint pages entitled *Loss recovery and Adaptive Playout Control for Packet Voice Communications over IP, Department of Electrical Engineering—Stanford University* (Apr. 19, 2000), (printed Sep. 25, 2002), (22 pages) as found at http://www–ise.stanford.edu/'yiliang/presentations/index.html.

* cited by examiner

US 6,757,292 B2

AUTOMATIC ADJUSTMENT OF BUFFER DEPTH FOR THE CORRECTION OF PACKET DELAY VARIATION

This application claims priority from co-pending U.S. provisional application No. 60/304,600 filed Jul. 11, 2001 having common assignee and the title Automatic Adjustment of Buffer Depth for the Correction of Packet Delay Variation.

This application uses a measurement of $PDV_P$ for triggering changes in state. One suitable method for measuring $PDV_P$ can be found in co-pending U.S. provisional application No. 60/307,747 filed Jul. 25, 2001 having common assignee and the title Measurement of Packet Delay Variation.

For the convenience of the reader, various acronyms and other terms used in the field of this invention are defined at the end of the specification in a glossary. Other terms used by the applicant to define the operation of the inventive system are defined throughout the specification. For the convenience of the reader, applicant has added a number of topic headings to make the internal organization of this specification apparent and to facilitate location of certain discussions. These topic headings are merely convenient aids and not limitations on the text found within that particular topic.

In order to promote clarity in the description, common terminology for components is used. The use of a specific term for a component suitable for carrying out some purpose within the disclosed invention should be construed as including all technical equivalents which operate to achieve the same purpose, whether or not the internal operation of the named component and the alternative component use the same principles. The use of such specificity to provide clarity should not be misconstrued as limiting the scope of the disclosure to the named component unless the limitation is made explicit in the description or the claims that follow.

FIELD OF THE INVENTION

This invention relates to communications systems and methods, in particular, to packet communication systems and methods. More specifically, the invention relates to systems and methods of using a Jitter Absorption Buffer (JAB) to absorb propagation delay variation in packet arrival time.

BACKGROUND OF THE INVENTION

Delay and Delay Variation in Packet Communications Systems

Packet communication systems, or networks, are commonly used for the conveyance of information for data applications. In general, these data applications are insensitive to absolute propagation delay (APD—the time it takes for a packet to propagate through the network) and propagation delay variation (PDV—changes in the APD, also known as jitter or wander).

Packet communications systems can also be used for transport of applications that are sensitive to APD and PDV. Examples include: 1) Direct voice applications such as VoIP; 2) Leased line applications transported via circuit emulation; 3) Video applications; and 4) Certain data protocols such as SNA. These examples are illustrative and not an exhaustive list.

It is fairly easy to remove the high frequency components of PDV using a Phase-Locked Loop (PLL). Throughout the rest of this application, PDV will refer to only the low frequency components of PDV.

Sensitivity to APD and PDV can be addressed in one of three ways:

First, the sensitive applications could be modified to handle larger values of APD and PDV. Increased tolerance of APD and PDV would come at the expense of decreased signal quality, or increased application complexity, or both. For example, some applications may dynamically modify the drain rate, use Forward Error Correction (FEC) systems to offset the impact of missing packets, or use various filling techniques to compensate for packets late enough to be treated as missing. Also, this approach is not suitable for many "legacy" applications that are no longer maintained or updated by their vendors.

Second, the APD and PDV of the network could be tightly controlled. This may not be feasible or cost-effective in existing packet networks. APD is composed of two main components: propagation delay via fibers or radio waves, and switching/queuing delays. Both of these components are difficult to change in a given network. PDV is usually caused by congestion. Traffic engineering or over-provisioning of bandwidth may reduce PDV, but these approaches may not be practical. One resource-intensive solution is to transmit a duplicate set of data along another route to reduce the chances that both a packet and its duplicate would be lost or excessively delayed. It would be preferable to achieve improvements in signal quality, rather than take the extreme measure of doubling the load on the network and more than doubling the processing to be performed at the receiving end.

The third alternative is that an external device could absorb the PDV by using a Jitter Absorption Buffer (JAB). The tradeoff with this alternative is that increased tolerance to PDV comes at the expense of APD. It is desirable to minimize APD for some applications like voice, but the JAB should be large enough to account for the variations in the rate of receiving packets, so that the buffer of received data does not frequently underflow (become empty) or overflow.

FIG. 1 illustrates how a JAB can correct PDV. FIG. 1A illustrates the general progression from transmit bits 10 through encapsulation 14 to transmit packets 20 through the packet network 24 to arriving packets 30 through the JAB 34 and de-encapsulation 38 to become a stream of receive bits 40. Consider a CBR (constant bit rate) application where the bits are created at constant rate R. The rate R remains constant because there are no pauses in the data stream. The application at the receiving end is typically set to receive and process bits at the same rate R. On the path from creation to processing at the receive end the transmit bits 10 first arrive at a device that encapsulates them into packets and injects the transmit packets 20 into a packet network 24 at rate P. Just as the bits arrive from the application at regular intervals (line 10 of FIG. 1B), the encapsulating device 14 sends out packets at regular interval (line 20 of FIG. 1B). However, the intervening packet network is not perfect, so it introduces PDV due to congestion.

Use of a JAB to Correct PDV

A system that is receiving packets from a network that introduces PDV will see the incoming packets arrive at a rate that over a large period of time averages out to be the creation rate P. But from moment to moment, the receive rate varies as congestion in the network causes variation in the amount of time for a packet to traverse the network. The received packets 30 are processed at the receive end and the encapsulated bits are extracted and placed into the JAB. Note that line 30 of FIG. 1B shows how the rhythmic release of transmit packets 20 has been distorted by variations in the APD for the various packets so that the stream of arriving packets 30 is irregular.

The JAB 34 absorbs the PDV by having a queue of received packets so that a steady stream of receive bits 40 can be released from de-encapsulation 38 (see Line 40 in FIG. 1B). The removal of PDV comes at the expense of APD. This is because the JAB adds additional delay to the packets that have traversed the network quickly, so that their APD is the same as packets that took a longer time to traverse the network.

In some ways, the use of a conservatively large JAB is worse than the situation of a convoy, where the convoy travels at the speed of the slowest ship. In this case the ships (packets) are free to travel across the ocean at their own speed but must wait outside the port (in the JAB) to re-form the convoy before entering the port. Furthermore, they must wait long enough for the slowest ship that has ever made the trip, even if all of the ships have arrived. A large JAB would mean that the system receiving the bits would be able to correct all but the most extreme instances of PDV, but APD is adversely affected because the APD for each of the packets is increased by the delay caused by the average depth of the JAB.

Bytes—The JAB feeds a circuit interface, so it is drained byte-by-byte. Also a discussion of a physical implementation is also more convenient in terms of bytes.

Here are some useful conversion formulas:

JAB Depth (time)=8 bits/byte*JAB Depth (bytes)/Circuit Bit Rate R (bps)

Packet Period (time)=1/Packet Rate P (pps)

Packet Payload (bytes)=Circuit Bit Rate R (bps)*Packet Period (time)/8 bits/byte JAB Physical Memory (bytes)=JAB Depth (time)*Circuit Bit Rate R (bps)/8 bits/byte Examples for common circuit types and rates are shown in Table 1 below.

TABLE 1

Comparison of Time, Packets and Bytes for Common Transmission Circuits

| Circuit Type | Circuit Rate (Mbps) | Packet Frame Count | Packet Payload (bytes) | Packet Period ($\mu$s) | Packet Rate P (pps) | Physical memory (Kbytes) for a JAB of this depth in ms | | |
|---|---|---|---|---|---|---|---|---|
| | | | | | | 32 | 64 | 128 |
| T1 | 1.544 | $10^1$ | 241.25 | 1250 | 800 | 6.2 | 12.4 | 24.7 |
| T3 | 44.736 | $1^2$ | 699 | 125 | 8000 | 178.9 | 357.9 | 715.8 |
| OC3 | 155.52 | $0.5^3$ | 1215 | 62.5 | 16000 | 622.1 | 1244.2 | 2488.3 |

Notes:
10 frames gives a good balance between efficiency (~83% with 50 bytes overhead) and capture delay
[1](1 ms)
[2]2 frames would exceed the 1508 byte maximum packet size for Ethernet
[3]1 frame would exceed the 1508 byte maximum packet size for Ethernet Some current methods for the correction of PDV use a fixed size JAB. Examples include: ASICs for ATM; CES and inverse multiplexers for ATM; and Frame Relay. While these devices sometimes allow for the user to configure the system to use one of several fixed values for the buffer, none of these devices dynamically adjust the buffer based on network conditions.

Other methods for the correction of PDV are adaptive, such as those used for VoIP and streaming video. These methods are designed for data streams such as voice or video that have the following characteristics: 1) Small imperfections are usually acceptable, so the effect of a discarded packet is small; 2) It is possible to construct a good approximation of missing data; and 3) There may be "quiet" periods that allow for simple re-sizing of the buffer.

These assumptions do not hold for arbitrary data streams such as those created during circuit emulation. Since these assumptions do not hold, these approaches are of limited use for arbitrary data streams. There is an unmet need for a system that can adjust to changes in network conditions to dynamically resize the JAB buffer and do so hitlessly under most circumstances that without introducing bit errors into the output.

Notes on Time Versus Packets Versus Bytes

In different situations, it is convenient to discuss the size of the JAB in terms of time, packets or bytes.

Time—Because APD and PDV are normally measured in units of microseconds ($\mu$s) or milliseconds (ms); it may useful to discuss the size of the JAB in terms of time.

Packets—It is more convenient to talk about the JAB in terms of packets when considering the current depth or fullness of the JAB.

The packet periods shown are typical, but they could be higher or lower for a given implementation.

Thus, a review of prior art solutions reveals a gap in solutions that work well for arbitrary data streams that do not lend themselves to the assumptions necessary for some prior art solutions.

It is therefore an object of this invention to provide robust correction of PDV in the presence of a network that is changing its PDV due to loading, congestion or other impairments.

It is a further object of this invention to provide robust correction of PDV without unduly increasing APD.

These and other advantages of the present invention are apparent from the drawings and the detailed description that follows.

SUMMARY OF THE DISCLOSURE

This disclosure reveals a method of PDV correction that is achieved through the dynamic control of the size of a JAB. Dynamic control allows for the minimum incremental APD that is sufficient for the correction of the PDV existing in the network.

DETAILED DESCRIPTION OF A PREFERRED EMBODIMENT

Figure 1A:
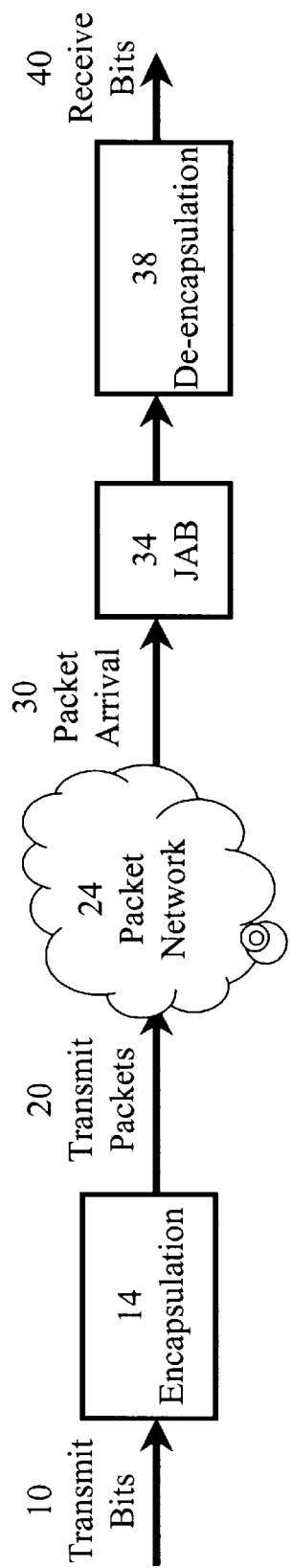
FIG. 1 illustrates the flow path and timing of bits and packets in a network with some variation in PDV.
Figure 1B:
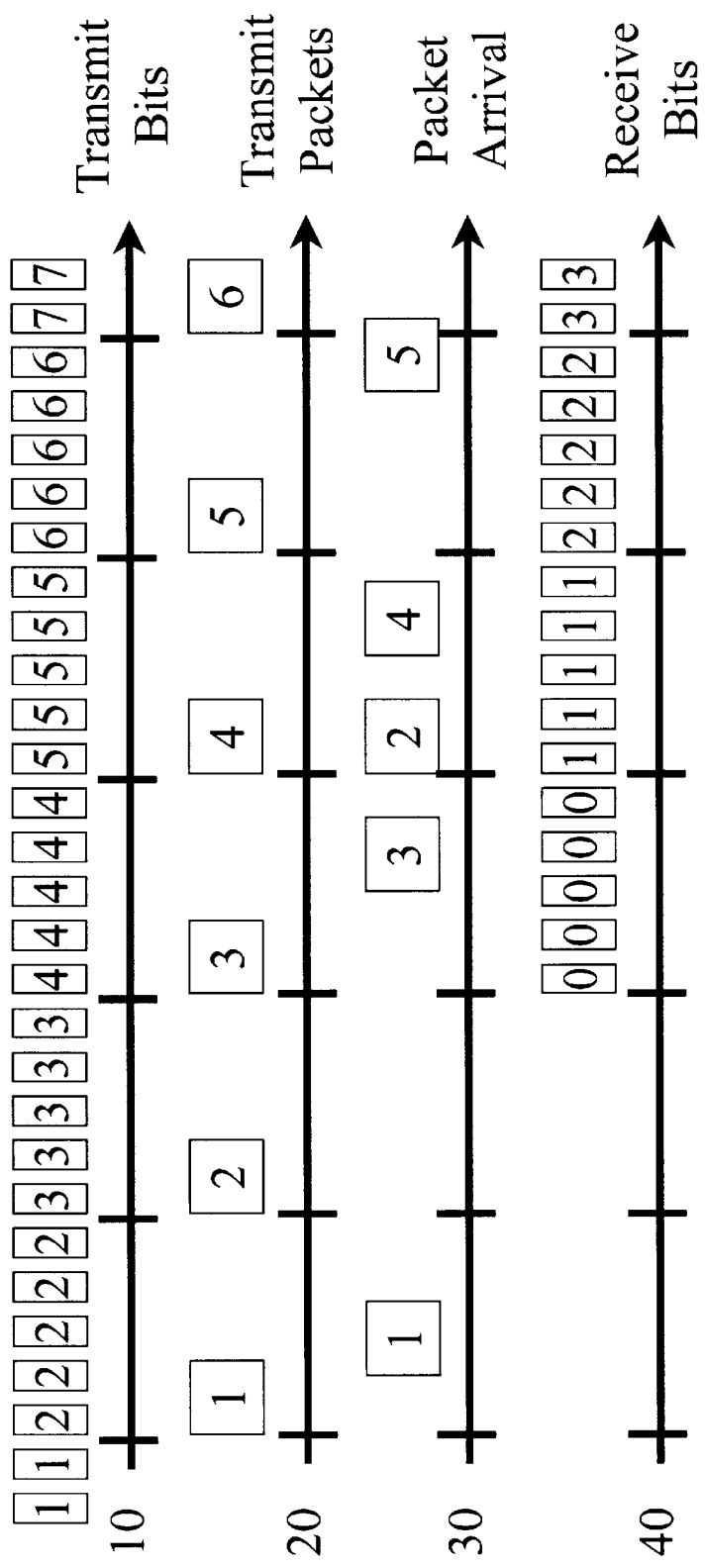

Dynamically Adjust the Depth of the JAB to Correct PDV

Since a small JAB size leads to loss of packets and a large JAB size increases APD, JAB size becomes an important design choice. In contrast to prior art solutions with fixed JAB sizes, the approach of the invention is to dynamically size the JAB based on network conditions. The disclosed method takes into account the fullness of the JAB, as well as on $PDV_P$, which is the peak-to-peak value of the PDV. One method for measuring $PDV_P$ is disclosed in the co-pending '747 application referenced above.

The general rules for changing the size of the JAB are:

If the JAB is almost empty or almost full, then re-center the JAB by modifying the output clock rate.

If the JAB overflows or underflows, or if the $PDV_P$ is high, then rapidly increase the size of the JAB.

If the JAB is not almost empty or almost full, and if $PDV_P$ is low for a sustained period of time, then re-center the JAB on the next lower size and then change the JAB to that size.

This approach allows the JAB to compensate for the peak-to-peak range of the low frequency component of PDV ("$PDV_P$") in the network, and yet be as small as possible in order to limit the incremental APD caused by JAB size.

State Machine

In a preferred embodiment of the present invention, there are three states, each with its own JAB size. This invention can be extended to any system that dynamically changes from one JAB size to another based on current conditions. Thus the number of states can be any number two or larger. Two states would probably be too coarse. It is currently felt that the optimal number of states would be from 3 to 5 states to avoid having an unduly complex system. This disclosure will explain the concept through the use of a three state example.

The three states are:

Low—This is the steady state when the current $PDV_P$ is low as defined by the threshold L.

Medium—This is the steady state when the current $PDV_P$ is medium as defined by the thresholds L and M.

High—This is the steady state when the current $PDV_P$ is high as defined by the threshold M.

There is also a timer T that is used in the states Medium and High. Once these states are entered, they cannot be exited for a state with a lower JAB size until the timer expires. (Note that although the same value T is used for both timer periods in this example, is it not a requirement of this invention that the same time delay be used for each movement from larger JAB to smaller JAB). The JAB size is set during transitions between states. This allows the JAB to be sized according to the current network $PDV_P$.

The inputs to the state machine are:

Almost Full—this is based on the High Water Mark (HWM) that is sampled periodically. The HWM indicates the fullest that the JAB has been since the last time it was sampled.

Almost Empty—this is based on the Low Water Mark (LWM) that is sampled periodically. The LWM indicates the emptiest that the JAB has been since the last time it was sampled.

$PDV_P$—This is a measure or estimate of the peak-to-peak range of the low frequency component of PDV.

Figure 2:
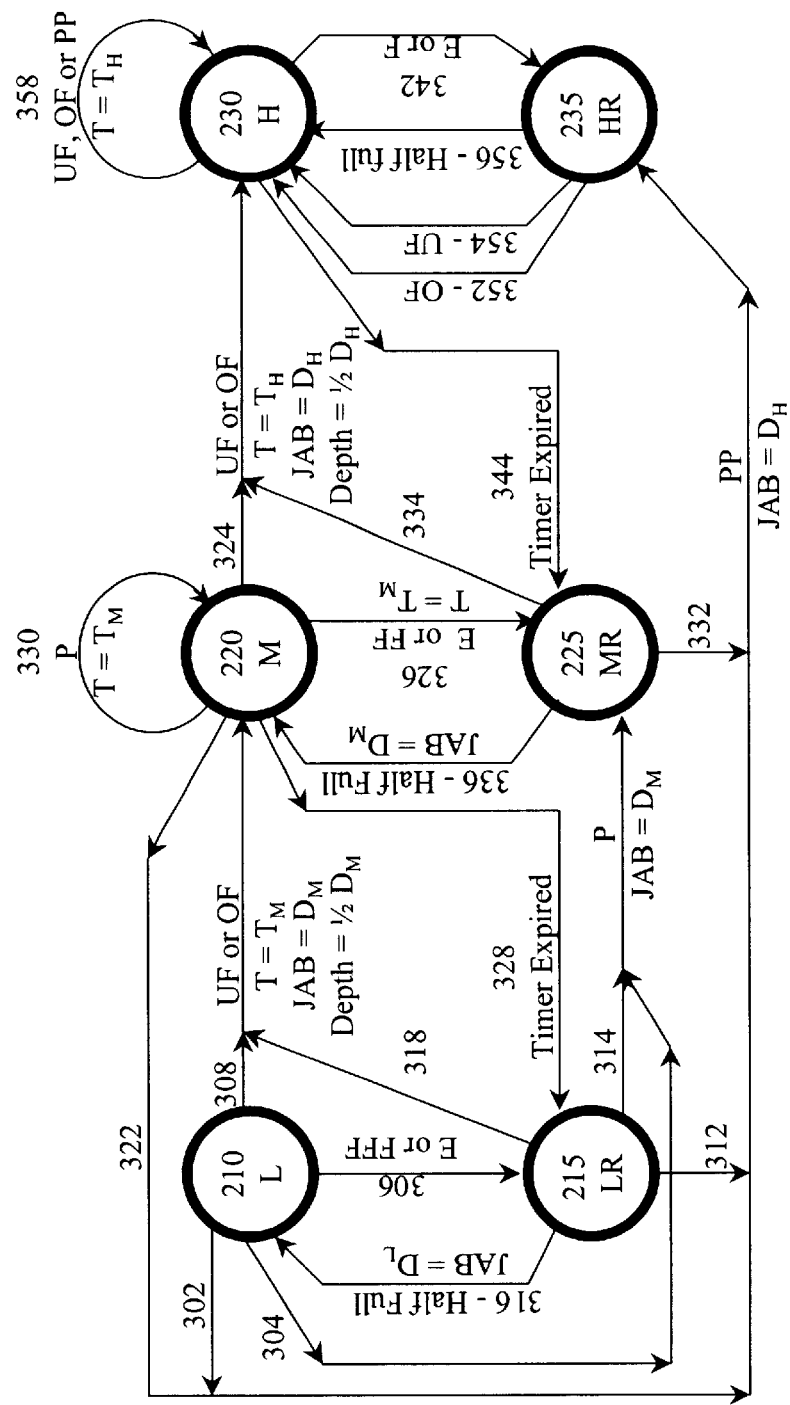
FIG. 2 provides a graphical depiction of the state machine, including the states and transitions.

Table 2 describes the state machine. FIG. 2 provides a graphical depiction of the state machine described in Table 2, including the states and transitions.

TABLE 2

State Machine For Control of JAB

| Status ▼ | States ▶ Abbreviation ▶ JAB Depth ▶ | Low (Initial State) L $D_L$ | Low Re-Center[1] LR $D_L$ or $D_M$ | Medium M $D_M$ | Medium Re-Center[1] MR $D_M$ or $D_H$ | High H $D_H$ | High Re-Center[1] HR $D_H$ |
|---|---|---|---|---|---|---|---|
| UF | Underflow | | Set timer to $T_M$ | | | Set timer to $T_H$ | |
| OF | Or Overflow | | Set JAB to $D_M$ | | | Set JAB to $D_H$ | |
|    |            | | Set depth to ½[2] | | | Set depth to ½[2] | |
|    |            | | → M | | | → H | |
| E | 0 ≦ LWM ≦ 2 | → LR | No Change | → MR | No Change | → HR | No Change |
| FFF | $D_L$ − 2 ≦ HWM ≦ $D_L$ | → LR | | | No Change | | |
| FF | $D_M$ − 2 ≦ HWM ≦ $D_M$ | | No Change | → MR | | No Change | |
| F | $D_H$ − 2 ≦ HWM ≦ $D_H$ | | | No Change | | → HR | No Change |
| P | L ≦ $PDV_P$ < M[3] | | Set JAB to $D_M$ | Set timer to $T_M$ | | No Change | |
|   |                  | | → MR | → M | | | |
| PP | M ≦ $PDV_P$ | | | Set JAB to $D_H$ | | Set timer to $T_H$ | No Change |
|    |            | | | → HR | | → H | |
| TE | Timer Expired | N/A[4] | N/A[4] | → LR | N/A[4] | → MR | N/A[4] |

TABLE 2-continued

State Machine For Control of JAB

| | | States▶ | Low (Initial State) | Low Re-Center[1] | Medium | Medium Re-Center[1] | High | High Re-Center[1] |
|---|---|---|---|---|---|---|---|---|
| ▼ | Abbreviation▶ | | L | LR | M | MR | H | HR |
| | Status▼ | JAB Depth▶ | $D_L$ | $D_L$ or $D_M$ | $D_M$ | $D_M$ or $D_H$ | $D_H$ | $D_H$ |
| BC | Buffer Centered | | No Change[5] | Set JAB to $D_L$[6] → L | No Change[5] | Set JAB to $D_M$[7] → M | No Change[5] | → H |

Notes:
[1]In the LR, MR and HR states the read clock is run at the maximum or minimum rate until the buffer is re-centered. This does not affect the data.
[2]Setting the depth to ½ means manipulating the read and/or write pointers so that the buffer is half full. Note that this is a disruptive operation. Since an overflow or underflow has already occurred, a further disruption is acceptable in order to restore normal operation as quickly as possible.
[3]One of skill in the art could modify the controls for P and PP to be L < $PDV_P$ ≦ M and M < $PDV_P$ without deviating from the teaching of this invention..
[4]Timer is not running when in this state.
[5]Whether the buffer is centered is not considered in this state.
[6]JAB will already be set to $D_L$ if previous state was L.
[7]JAB will already be set to $D_M$ if previous state was L or LR.

State Transitions and Resizing the JAB

In most situations, the optimum state of the JAB is half full. Half full gives the most tolerance to positive or negative bursts of PDV. It is therefore desirable to center the JAB following a change of state and JAB size setting. The re-centering occurs in the LR, MR and HR states.

When the JAB is less than half full, the output clock ("drain rate") is slowed to the minimum allowable value until the JAB is filled to half full or more. For a JAB on a T1 line, the minimum rate is the nominal rate R (1.544 Mbps)—50 ppm (parts per million), for a rate of 1,543,922.8 bps.

When the JAB is more than half full, the output clock ("drain rate") is increased to the maximum allowable value until the JAB is drained to half full or less. For a T1 line, the maximum rate is 1.544 Mbps+50 ppm= 1,544,077.2 bps.

The worst-case time for increasing the size of the JAB is when the JAB is empty. The corresponding time is given by the time that it takes to increase the new buffer depth to half full. The worst-case time for decreasing the JAB size is even longer. This is when the buffer is at the "almost full" threshold and must be drained from the old size down to half of the new size. Examples for adjustment times are shown in Table 3 below.

allowing a transition to a state with a smaller JAB size. Thus, in the preferred embodiment, the state machine includes state LR, MR, HR as interim states for some transitions to L, M, or H. Once the JAB depth reaches 50% of the size for the target JAB buffer, the state moves from LR to L, MR to M, or HR to H. Sometimes the JAB depth will reach and cross the 50% threshold before the next time JAB depth is sampled. The system will count this as being re-centered and will then transition from LR, MR, or HR to the corresponding state of L, M, or H.

An alternative embodiment would rely an appropriate timer value and the altered clock speed to achieve the centering and would trigger a state change upon expiration of the timer without requiring that the JAB actually reach the 50% size target.

Those of skill in the art could expand the target range of 50% to 50% to a range of acceptable center values such as 45% to 55% of the relevant size, 40% to 60% of the relevant size, and so on. This would expand the definition of re-center size so that the re-centering process finishes faster. While we have expressed this concept in terms of percentages, it could be incorporated using fractions such as ⅓ and ⅔ that do not translate into non-repeating decimal numbers without deviating from the spirit of this invention. The term percentages should be read to include fractional values.

TABLE 3

Examples of JAB Adjustment Times

| Circuit Type | Circuit Rate (Mbps) | Required Accuracy (ppm) | Max. Freq. Change Rate (bps/s) | Max. Depth Change Rate (ms/s) | | $D_L$ = 10 Time to adj | $D_M$ = 40 ust JAB size | $D_H$ = 127 (minutes) | | |
|---|---|---|---|---|---|---|---|---|---|---|
| | | | | | Old (ms) | 38 | 125 | 2 | 2 | 2 |
| | | | | | New (ms) | 5 | 20 | 5 | 20 | 63 |
| | | | | | Delta (ms) | 33 | 105 | 3 | 18 | 61 |
| T1 | 1.544 | 50 | 77.2 | 0.05 | | 11 | 35 | 1 | 6 | 20 |
| T3 | 44.736 | 50 | 2236.8 | 0.05 | | 11 | 35 | 1 | 6 | 20 |
| OC3 | 155.52 | 20 | 3110.4 | 0.02 | | 28 | 88 | 3 | 15 | 51 |

To ensure system stability, it is useful to make sure that the JAB is re-centered for the size of the smaller JAB before Special Treatment of Underflows and Overflows.

In the event of an underflow or overflow event, the JAB size is increased from L to M or M to H and the JAB depth is set at ½ of the new JAB size. Filler data is added if necessary to achieve a depth of ½ of the new JAB size.

Figure 4:
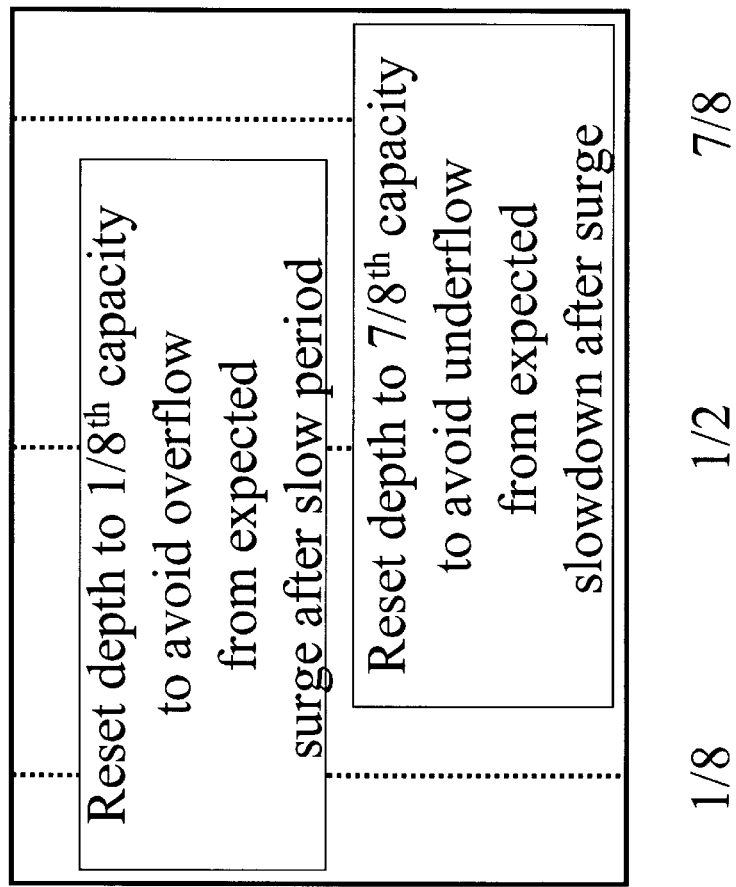
FIG. 4 illustrates the concept of setting the JAB depth to either a depth biased to handle an expected surge or slowdown in packets arrivals following an underflow or an overflow.

As illustrated in FIG. 4, a variation of the scheme described above is to make an exception when there is an overflow for in a JAB that is already at the largest size. In this case, one can anticipate that the surge in packets that led to the overflow will be followed by a slow period with fewer packets arriving. Thus, the highest level of stability would come from setting the JAB buffer depth at something above half full. In order to avoid triggering the applicable test for F, the JAB depth would need to be below F. In one preferred implementation, when the largest JAB has an overflow, the buffer depth is set to $7/8^{th}$ of the buffer size. This modification allows for more robust operation in the presence of large amounts of PDV.

Similarly, the scheme can be modified so that the buffer is forced to something between the trigger for E and half the buffer size after an underflow when the JAB is already at its largest size. Unless there is some other major system problem, an underflow should be followed by a surge in the number of packets arriving over a period of time. In one preferred implementation, the response to an underflow when the buffer is already at its largest size is to set buffer depth at $1/8^{th}$ of the buffer size.

Detailed Examination of State Machine in FIG. 2

With the preceding explanation of the operation of the state machine 200 shown in FIG. 2. The state transitions can be set forth as follows.

302 transition from L 210 to HR 235 when PP (M<= $PDV_P$), that is when $PDV_P$ exceeds or equals the upper threshold for state M.

304 transition from L 210 to MR 225 when P (L<= $PDV_P$<M), that is when $PDV_P$ is beyond the upper threshold for state L but below the upper threshold for state M.

306 transition from L 210 to LR 215 when E that is when JAB depth is detected at or below 2 packets but there is not an underflow, or when FFF, that is when JAB depth is detected within 2 packets of JAB size for state L but there has not been an overflow.

This transition from L to LR works to re-center the JAB depth in an attempt to avoid an underflow or overflow.

308 transition from L 210 to M 220 when there is an underflow or overflow. The JAB depth is set to ½ of $D_M$.

312 transition from LR 215 to HR 235 when PP (M<= $PDV_P$), that is when $PDV_P$ exceeds or equals the upper threshold for state M.

314 transition from LR 215 to MR 225 when P (L<= $PDV_P$<M), that is when $PDV_P$ is exceeds or equals the upper threshold for state L but below the upper threshold for state M.

316 transition from LR 215 to L 210 after completion of the centering operation. In the preferred embodiment this is triggered when the JAB depth reaches 50% of the current JAB size for state L.

318 transition from LR 215 to M 220 upon underflow or overflow. The JAB depth is set to ½ of $D_M$.

322 transition from M 220 to HR 235 when PP (M<= $PDV_P$), that is when $PDV_P$ exceeds or equals the upper threshold for state M.

324 transition from M 220 to H 230 when there is an underflow or overflow. The JAB depth is set to ½ of $D_H$.

326 transition from M 220 to MR 225 when E that is when JAB depth is detected at or below 2 packets but there is not an underflow, or when FF/FFF, that is when JAB depth is detected within 2 packets of the JAB size for state M but there has not been an overflow. This move from M to MR triggers an effort to move the JAB depth back towards the center to avoid an overflow or underflow.

328 transition from M 220 to LR 215 upon completion of timer set to $T_M$ upon entry into state M and reset anytime condition P is detected, that is when $PDV_P$ is beyond the upper threshold for state L but below the upper threshold for state M.

330 transition from M 220 to M 220 when P (L<= $PDV_P$<M), that is when $PDV_P$ exceeds or equals the upper threshold for state L but below the upper threshold for state M.

332 transition from MR 225 to HR 235 when PP (M<= $PDV_P$), that is when $PDV_P$ exceeds or equals the upper threshold for state M.

334 transition from MR 225 to H 230 when there is an underflow or overflow. The JAB depth is set to ½ of $D_H$.

336 transition from MR 225 to M 220 after completion of the centering operation. In the preferred embodiment this is triggered when the JAB depth reaches 50% of the current JAB size for state M.

342 transition from H 230 to HR 235 when E that is when JAB depth is detected at or below 2 packets but there is not an underflow, or when F/FF/FFF, that is when JAB depth is detected within 2 packets of JAB size for state H but there has not been an overflow. The movement from H to HR causes an effort to re-center the JAB depth in an attempt to avoid an underflow or overflow.

344 transition from H 230 to MR 225 upon completion of timer set to $T_H$ upon entry into state H and reset anytime condition underflow, overflow, or PP is detected, that is when $PDV_P$ is beyond the upper threshold for state M.

352 transition from HR 235 to H 230 upon overflow. May optionally set JAB depth to $7/8^{th}$ of $D_H$.

354 transition from HR 235 to H 230 upon underflow. May optionally set JAB depth to $1/8^{th}$ of $D_H$.

356 transition from HR 235 to H 230 after completion of the centering operation. In the preferred embodiment this is triggered when the JAB depth reaches 50% of the current JAB size.

Figure 3:
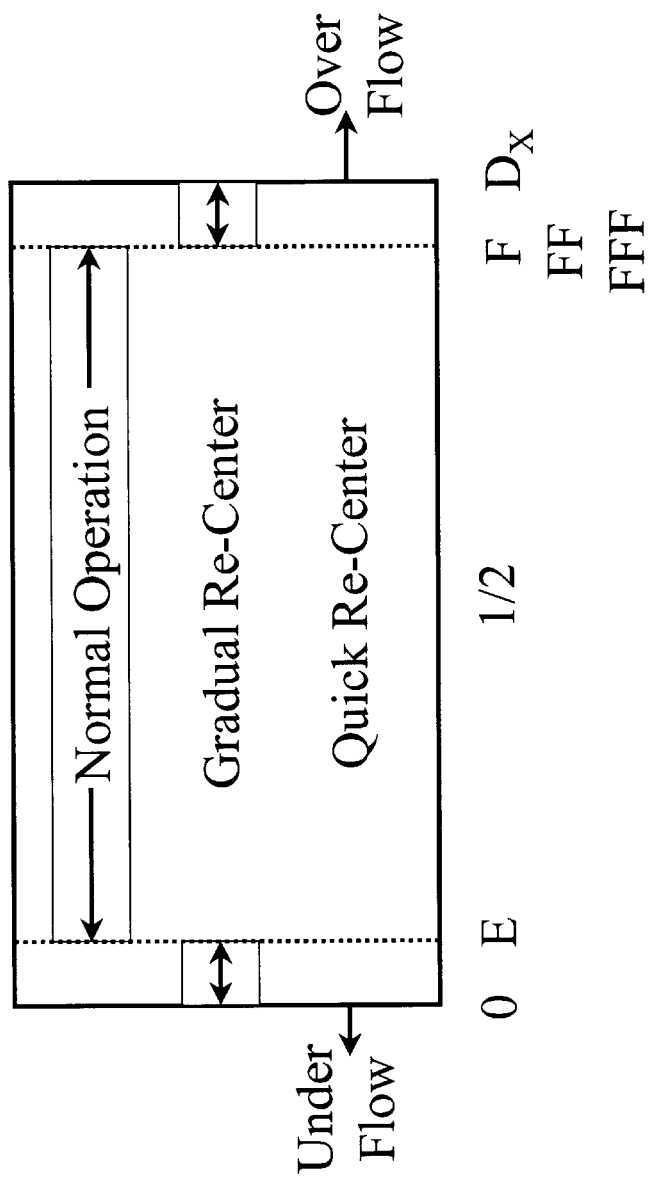
FIG. 3 illustrates the concept of various tiers of control strategies to keep the JAB depth centered within a JAB buffer of capacity $D_X$.

358 transition from H 230 to H 230 when PP (M<= $PDV_P$), that is when $PDV_P$ is exceeds or equals the upper threshold for state M; or after and overflow or underflow. Reset timer to $T_H$ Thus, as illustrated in FIG. 3, the present invention teaches the advantages of having several tiers of control mechanisms to keep the JAB depth towards the center of the JAB capacity. In addition to the normal operation, there is another mechanism to gradually re-center the buffer depth if the buffer depth reaches E or F/FF/FFF. If the buffer depth goes to underflow or overflow, then more drastic measures are taken to force the depth to a centered value (or a biased centered value as described above).

Default Values

Table 4 below shows the default values for the timers and the various attributes of the JAB and the state transitions. Note that the operator may set these values. The timer values in the table are for a T1 where the maximum deviation is 50 ppm.

TABLE 4

| Parameter | Typical Values Default Value for a packet size of 8 frames |
|---|---|
| $D_L$ | 10 ms = 10 packets |
| $T_M$ | 15 minutes |
| $D_M$ | 40 ms = 40 packets |
| $T_H$ | 15 minutes |
| $D_H$ | 127 ms = 127 packets |
| L | 5 ms = 5 packets. |
| M | 32 ms = 32 packets |

| Parameter | Alternative set of values for a packet size of 10 frames |
|---|---|
| $D_L$ | 12.5 ms = 10 packets |
| $T_M$ | 60 minutes |
| $D_M$ | 40 ms = 32 packets |
| $T_H$ | 60 minutes |
| $D_H$ | 159 ms = 127 packets |
| L | 6 ms or 4.8 packets |
| M | 32 ms or 25.6 packets |

Alternative Embodiments

Figure 2A:
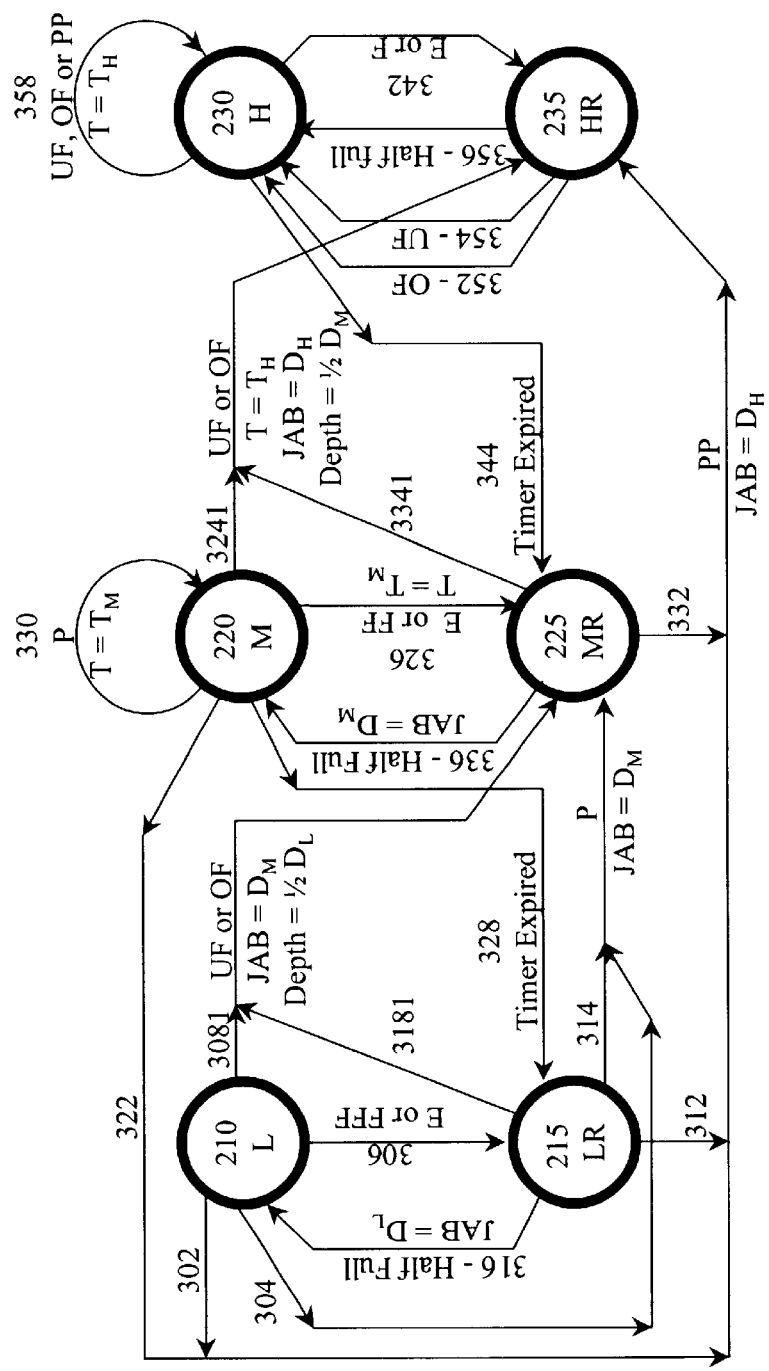
FIG. 2A provides a graphical depiction of an alternative embodiment of the state machine, including the states and transitions. This embodiment uses the built-in capacity of a JAB buffer to reset to ½ of the current buffer capacity.

Although it is believed that the state machine in FIG. 2 has advantages over the state machine in FIG. 2A, FIG. 2A represents a compromise that may be useful in implementing the teachings of this patent. FIG. 2A has replaced

308 transition from L 210 to M 220 when there is an underflow or overflow. The JAB depth is set to ½ of $D_M$ with:

3081 transition from L 210 to MR 225 when there is an underflow or overflow. JAB capacity is set to $D_M$. The JAB depth is set to ½ of L.

The embodiment takes advantage of the built-in capacity of JAB buffers to reset to ½ of current capacity upon underflow or overflow. Thus, the transition from state L 210 to state M 220 is done in steps. Reset depth, change capacity to $D_M$, achieve the centering state in MR 225 and transition 336 to state M 220. For the same reasons, FIG. 2A shows transition 3241 replacing transition 324, transition 3181 replacing transition 318, and transition 3341 replacing transition 334.

The present invention can be combined with adaptive timing which alters the drain rate of the JAB buffer based on the average arrival time of packets. Thus, the "normal operation" shown in FIG. 3 can incorporate adaptive timing to provide moderate correction for swings in JAB depth and be augmented with the more severe adjustments to drain rate when the depth goes below E or above F/FF/FFF as described above.

Those skilled in the art will recognize that the methods and apparatus of the present invention has many applications and that the present invention is not limited to the specific examples given to promote understanding of the present invention. Moreover, the scope of the present invention covers the range of variations, modifications, and substitutes for the system components described herein, as would be known to those of skill in the art.

The legal limitations of the scope of the claimed invention are set forth in the claims that follow and extend to cover their legal equivalents. Those unfamiliar with the legal tests for equivalency should consult a person registered to practice before the patent authority which granted this patent such as the United States Patent and Trademark Office or its counterpart.

| Acronyms and Abbreviations | |
|---|---|
| APD | Absolute Packet Delay |
| CBR | Constant Bit Rate |
| bps | bits per second |
| JAB | Jitter Absorption Buffer |
| LWM | Low Water Mark |
| HWM | High Water Mark |
| ms | milliseconds |
| ppm | parts per million |
| pps | packets per second |
| PDV | Packet Delay Variation |
| $\mu s$ | microseconds |

What is claimed is:

1. A method for dynamically sizing a jitter absorption buffer to react to network conditions the jitter absorption buffer having a jitter absorption buffer size, and a jitter absorption buffer depth, the method comprising:

A. receiving packets from a constant bit rate source;
   B. detecting a period of packet delay variation above a first threshold level; before
   C. hitlessly increasing the jitter absorption buffer size from a first size to a second size; before
   D. detecting a period of packet delay variation below the first threshold level; and then
   E. waiting until the jitter absorption buffer depth is appropriate for use with a jitter absorption buffer having a jitter absorption buffer size of the first size while continuing to receive packets from the constant bit rate source before hitlessly decreasing the jitter absorption buffer size from the second size to the first size whereby the size of the jitter absorption buffer is increased to compensate for network conditions leading to elevated levels of packet delay variation and decreased in order to limit any incremental packet delay attributed to jitter absorption buffer depth.

2. The method of claim 1 wherein:

the step of increasing the jitter absorption buffer size from the first size to the second size includes an act of setting a timer to time a period P;

resetting the unexpired timer timing a period of P to time a period P in the event of subsequent detection of another period of packet delay variation above the first threshold level;

the step of decreasing the jitter absorption buffer size from the second size to the first size occurs after the timer timing a period of P expires.

3. The method of claim 1 wherein the step of detecting a period of packet delay variation above a first threshold level comprises:

comparing an estimate of recent peak-to-peak range of a low frequency component of packet delay variation against a stored value; and reacting when the estimate of recent peak-to-peak range of the low frequency component of packet delay variation exceeds the stored value as a detection of a period of packet delay variation above the first threshold level.

4. The method of claim 1 wherein the step of increasing the jitter absorption buffer size from the first size to the second size includes an act of re-centering, an act of re-centering comprising:

altering an output clock for the jitter absorption buffer to a certain fixed slow clock rate to gradually move the jitter absorption buffer depth from below a specified minimum percentage of the second size to above the specified minimum percentage of the second size IF a depth measurement for the jitter absorption buffer is initially less than the specified minimum percentage of the second size; and altering the output clock for the jitter absorption buffer to a certain fixed fast clock rate to gradually move the jitter absorption buffer depth from above a specified maximum percentage of the second size to below the specified maximum percentage of the second size IF a depth measurement for the jitter absorption buffer is initially more than the specified maximum percentage of the second size, the specified minimum percentage not necessarily equal to the specified maximum percentage.

5. The method of claim 1 wherein the step of waiting until the jitter absorption buffer depth is appropriate for use with a jitter absorption buffer having a jitter absorption buffer size of the first size includes the act of re-centering, the act of re-centering comprising:

altering an output clock for the jitter absorption buffer to a certain fixed slow clock rate to gradually move the jitter absorption buffer depth from below a specified minimum percentage of the first size to above the specified minimum percentage of the first size IF the depth of the jitter absorption buffer is initially less than the specified minimum percentage of the first size; and altering the output clock for the jitter absorption buffer to a certain fixed fast clock rate to gradually move the jitter absorption buffer depth from above a specified maximum percentage of the first size to below the specified maximum percentage of the second size IF the depth of the jitter absorption buffer is initially more than the specified maximum percentage of the first size, the specified minimum percentage not necessarily equal to the specified maximum percentage.

6. The method of claim 1 further comprising steps to promote centering of the jitter absorption depth when the jitter absorption buffer is the first size, the steps comprising:

using adaptive timing to assist in keeping jitter absorption buffer depth centered between a set low level threshold and a set high level threshold;

recognizing before an underflow event that the jitter absorption buffer depth is below the set low level threshold and altering an output clock for the jitter absorption buffer to a certain fixed slow clock rate until moving the jitter absorption buffer depth from below a specified minimum percentage of the first size to above the specified minimum percentage of the first size; and recognizing before an overflow event that the jitter absorption buffer depth is above the set high level threshold and altering the output clock for the jitter absorption buffer to a certain fixed fast clock rate until moving the jitter absorption buffer depth from above a specified maximum percentage of the first size to below the specified maximum percentage of the first size, the specified minimum percentage not necessarily equal to the specified maximum percentage.

7. The method of claim 1 further comprising a re-centering function, the re-centering function including the steps of:

detecting an excursion of jitter absorption buffer depth into a range between empty and a low level set point;

moving from a first state having a jitter absorption buffer size of C, a fixed buffer drain rate of R, to a second state having a drain rate equal to R minus delta; and maintaining the second state until the drain rate of R minus delta causes the jitter absorption depth to cross a set value, then returning to the first state with drain rate of R.

8. The method of claim 8 wherein the return from the second state to the first state occurs when the jitter absorption depth reaches at least 50% of C, whereby the jitter absorption buffer is managed so as to avoid a buffer underflow without increasing the jitter absorption buffer size.

9. The method of claim 1 the method further including a re-centering function, the re-centering function including the steps of:

detecting an excursion of jitter absorption buffer depth into a range between a high level set point and full;

moving from a first state having a jitter absorption buffer size of C, a buffer drain rate or R, to a second state having a fixed drain rate equal to R plus delta; and maintaining the second state until the drain rate of R plus delta causes the jitter absorption depth to cross a set value, then returning to the first state with drain rate of R;

whereby the jitter absorption buffer is managed so as to avoid a buffer overflow without increasing the jitter absorption buffer size.

10. A method for dynamically sizing a jitter absorption buffer to react to network conditions, the method comprising:

establishing a first packet delay variation threshold and a second packet delay variation threshold, the second packet delay variation threshold representing a more significant amount of packet delay variation;

periodically estimating packet delay variation;

upon detecting an estimate of packet delay variation in excess of the first packet delay threshold but less than the second packet delay threshold, increasing the jitter absorption buffer size from a first size to a second size;

after a period of time T without a subsequent estimate of packet delay variation in excess of the first packet delay threshold, decreasing the jitter absorption buffer size from the second size to the first size;

upon detecting an estimate of packet delay variation in excess of the second packet delay threshold, increasing the jitter absorption buffer size from the first size to a third size;

after a period of time P without a subsequent estimate of packet delay variation in excess of the second packet delay threshold, decreasing the jitter absorption buffer size from the third size to the second size;

whereby the size of the jitter absorption buffer is increased rapidly from the first size to the third size to compensate for severe network conditions leading to elevated levels of packet delay variation and decreased gradually from the third size to the second size to limit the incremental packet delay attributed to jitter absorption buffer depth.

11. A set of rules implemented in a control system for adjusting a JAB buffer depth for a JAB buffer with a base drain rate of R, comprising:

A. an input for the JAB buffer depth;

B. an input for receiving the current estimate of a low frequency component of packet delay variation;

C. a stored value Size 1 for a first JAB size;

D. a stored value Size 2 for a second JAB size, the second JAB size larger than the first JAB size;

E. a stored value JAB1UL representing an upper limit for the low frequency component of packet delay variation for a State 1 using the first JAB size;

F. a stored value JAB2UL representing the upper limit for the low frequency component of packet delay variation for a State 2 using the second JAB size;

G. a rule causing a state change from State 1 having JAB size of Size 1 to a State 2R when a current estimate of the low frequency component of packet delay variation is at least JAB1UL and less than JAB2UL;

H. a means for altering the drain rate while in State 2R until the JAB buffer depth satisfies a centering criteria for State 2;

I. a rule causing a state change from State 2R to State 2 after the JAB buffer depth satisfies the centering criteria for State 2;

J. a means for timing a period T2 starting upon the state change from State 2R to State 2;

K. a means for re-starting a new period of length T2 upon receipt of a new estimate of the low frequency component of packet delay variation of at least JAB1UL and less than JAB2UL while within State 2;

L. a rule causing a state change from State 2 to State 1R upon completion of timing period T2;

M. a means for altering the drain rate while in State 1 R until the JAB depth satisfies a centering criteria for State 1; and N. a rule causing a state change from State 1 R to State 1 after the JAB depth satisfies the centering criteria for State 1.

12. The set of rules implemented in the control system for adjusting a JAB buffer depth for the JAB buffer with the base drain rate of R from claim 11 further comprising:

a stored value JAB1AF for an almost-full set point for State 1; and a rule causing a state change from State 1 to State 1R when a JAB depth measurement exceeds JAB1AF but has not reached an overflow;

wherein operation of this rule triggers the means for altering the drain rate while in State 1R until the JAB depth satisfies a centering criteria for State 1 before a state change back from State 1R to State 1.

13. The set of rules implemented in the control system for adjusting the JAB buffer depth for the JAB buffer with the base drain rate of R from claim 12 further comprising:

a stored value JAB1AE for an almost-empty set point; and a rule causing a state change from State 1 to State 1R when a JAB depth measurement falls below JAB1AE but has not reached an underflow;

wherein operation of this rule triggers the means for altering the drain rate while in State 1R until the JAB depth satisfies a centering criteria for State 1 before a state change back from State 1R to State 1.

14. The set of rules implemented in the control system for adjusting the JAB buffer depth for the JAB buffer with the base drain rate of R from claim 11 further comprising:

a rule for overflows causing a state change from State 1 to State 2 upon detection of an overflow of the JAB while in State 1, operation of the overflow rule including forcing the JAB buffer depth within State 2 to a specified overflow-recovery-percentage of Size 2;

a rule for underflows causing a state change from State 1 to State 2 upon detection of an underflow of the JAB while in State 1, operation of the underflow rule including forcing the JAB buffer depth within State 2 to a specified underflow-recovery-percentage of Size 2;

a rule for overflows causing a state change from State 1R to State 2 upon detection of an overflow of the JAB while in State 1R, operation of the overflow rule including forcing the JAB buffer depth within State 2 to a specified overflow-recovery-percentage of Size 2; and a rule for underflows causing a state change from State 1R to State 2 upon detection of an underflow of the JAB while in State 1R, operation of the underflow rule including forcing the JAB buffer depth within State 2 to a specified underflow-recovery-percentage of Size 2.

15. The set of rules implemented in the control system for adjusting the JAB buffer depth for the JAB buffer with the base drain rate of R from claim 14 wherein the specified overflow-recovery-percentage equals the specified underflow-recovery-percentage.

16. The set of rules implemented in the control system for adjusting the JAB buffer depth for the JAB buffer with the base drain rate of R from claim 11 further comprising:

a stored value JAB2AF for an almost-full set point for State 2; and a rule causing a state change from State 2 to State 2R when a JAB buffer depth measurement exceeds JAB2AF but has not reached an overflow;

wherein operation of this rule triggers the means for altering the drain rate while in State 2R until the JAB buffer depth satisfies a centering criteria for State 2 before a state change back from State 2R to State 2; and A rule for overflows while in State 2, operation of the overflow rule including forcing the JAB buffer depth within State 2 to a specified max-JAB-overflow-recovery-size2;

wherein the max-JAB-overflow-recovery-size2 is more than 50% of Size 2 and less than JAB2AF.

17. The set of rules implemented in the control system for adjusting the JAB buffer depth for the JAB buffer with the base drain rate of R from claim 11 further comprising:

a stored value JAB2AE for an almost-empty set point for State 2; and a rule causing a state change from State 2 to State 2R when a JAB buffer depth measurement falls below JAB2AE but has not reached an underflow;

wherein operation of this rule triggers the means for altering the drain rate while in State 2R until the JAB buffer depth satisfies a centering criteria for State 2 before a state change back from State 2R to State 2; and a rule for underflows while in State 2, operation of the overflow rule including forcing the JAB buffer depth within State 2 to a specified max-JAB-underflow-recovery-size2;

wherein the max-JAB-overflow-recovery-size2 is more than JAB2AE and less than 50% of Size 2.

18. The set of rules implemented in the control system for adjusting the JAB buffer depth for the JAB buffer with the base drain rate of R from claim 11 further comprising:

a rule for overflows causing a state change from State 1 to State 2R upon detection of an overflow of the JAB while in State 1, the operation of the overflow rule including forcing the JAB depth to a specified overflow-recovery-percentage of Size 1 before a transition to State 2R;

a rule for underflows causing a state change from State 1 to State 2R upon detection of an underflow of the JAB while in State 1, the operation of the underflow rule including forcing the JAB depth to a specified underflow-recovery-percentage of Size 1 before a transition to State 2R;

a rule for overflows causing a state change from State 1 R to State 2R upon detection of an overflow of the JAB while in State 1R, the operation of the overflow rule including forcing the JAB depth to a specified overflow-recovery-percentage of Size 1 before a transition to State 2R; and a rule for underflows causing a state change from State 1R to State 2R upon detection of an underflow of the JAB while in State 1R, the operation of the underflow rule including forcing the JAB depth to a specified underflow-recovery-percentage of Size 1 before a transition to State 2R.

19. The set of rules implemented in the control system for adjusting the JAB buffer depth for the JAB buffer with the base drain rate of R from claim 11 further comprising:

O. a stored value Size N for a State N JAB size;

P. a stored value Size N–1 for a State N–1 JAB size, the State N JAB size larger than the State N–1 JAB size;

Q. a stored value JABN-1UL representing an upper limit for the low frequency component of packet delay variation for the State N–1 using the State N–1 JAB size;

R. a rule causing a state change from State 1 having JAB size of Size 1 to a State NR when the current estimate of the low frequency component of packet delay variation is at least JABN-1UL;

S. a means for altering the drain rate while in State NR until the JAB buffer depth reaches a target range of Size N;

T. a rule causing a state change from State NR to State N after the JAB buffer depth reaches the target range of Size N;

U. a means for timing a period TN starting upon state change from State NR to State N;

V. a means for re-starting a new period of length TN upon receipt of a new estimate of the low frequency component of packet delay variation of at least JABN-1UL while within State N;

W. a rule causing a state change from State N to State N–1R upon completion of timing period TN;

X. a means for altering the drain rate while in State N–1R until the JAB buffer depth reaches a target range of Size N–1; and Y. a rule causing a state change from State N–1R to State N–1 after the JAB buffer depth reaches the target range of Size N–1.

20. The set of rules implemented in the control system the adjusting the JAB buffer depth for the JAB buffer with the drain rate of R from claim 19 wherein:

State N–1 is another name for State 2;

Size N–1 is another name for Size 2;

State N–1R is another name for State 2R;

State JABN-1UL is another name for JAB2UL;

whereby a new estimate of the low frequency component of packet delay variation can lead to:

remaining within State 1 with JAB size of Size 1 if the current estimate of the low frequency component of packet delay variation does not exceed JAB 1UL;

changing to State 2R to re-center before entering State 2 with JAB size of Size 2 if the current estimate of the low frequency component of packet delay variation exceeds JAB1UL but does not exceed JAB2UL; and changing to State NR to re-center before entering State N if the current estimate of the low frequency component of packet delay variation exceeds JAB2UL.

21. A control system for reducing the frequency of underflow/overflow events for a JAB buffer with a base drain rate of R and a JAB buffer size of S by moving JAB buffer depth away from JAB buffer depth extremes of empty and full, the control system comprising: a moderate means to move the JAB buffer depth away from JAB buffer depth extremes, the moderate means comprising:

triggering a use of a fixed JAB buffer drain rate of RF after detection of a JAB buffer depth in excess of a too-much set point; and triggering a use of a fixed JAB buffer drain rate of RS after detection of a JAB buffer depth below a too-little set point;

wherein the too-much set point is larger than the too-little set point, and the drain rate RS is less than the base drain rate R, which is less than the drain rate RF;

a quick means to reset the JAB buffer depth, comprising:

setting the JAB buffer depth to a post-overflow-percent of S after an overflow; and setting the JAB buffer depth to a post-underflow-percent of S after an underflow.

22. The control system of claim 21 further comprising a gentle means to move JAB buffer depth away from the JAB buffer depth extremes through the use of adaptive timing.

23. The control system of claim 21 further comprising the ability to vary the JAB buffer size S from a first size to a max size so that the JAB buffer size S is increased from the first size to the max size upon operation of the moderate means when the JAB buffer size S is the first size.

24. The control system of claim 23 further comprising a first PDV trigger for the moderate means, the first PDV trigger working to engage the moderate means upon detection of an estimate of a PDV component in excess of a PDV trigger set point.

25. The control system of claim 24 further comprising the ability to vary the JAB buffer size S from the first size to a second size and from the second size to the max size, the control system having the first PDV triggers set point that causes the change of size from the first size to the max size, and a second PDV trigger set point that causes a change of size from the first size to the second size.

* * * * *

UNITED STATES PATENT AND TRADEMARK OFFICE
CERTIFICATE OF CORRECTION

PATENT NO. : 6,757,292 B2
APPLICATION NO. : 10/141592
DATED : June 29, 2004
INVENTOR(S) : Pate et al.

It is certified that error appears in the above-identified patent and that said Letters Patent is hereby corrected as shown below:

Column 14, Line 5 "claim 8" should be changed to --claim 7--.

Column 18, Lines 17 to 19, needs to be revised by breaking this text into two paragraphs, the first starting at Column 18, Line 17 with "and full," and ending with the semicolon found at Column 18, Line 17; the second paragraph starting with "a moderate" found at Column 18, Line 17 and ending with the semicolon found after "comprising" at Column 18, Line 19.

Signed and Sealed this

Fourth Day of November, 2008

JON W. DUDAS
*Director of the United States Patent and Trademark Office*